(12) United States Patent
Shigeta et al.

(10) Patent No.: US 9,342,142 B2
(45) Date of Patent: May 17, 2016

(54) DISPLAY CONTROL APPARATUS, DISPLAY CONTROL METHOD, AND DISPLAY CONTROL PROGRAM

(75) Inventors: Osamu Shigeta, Tokyo (JP); Takuro Noda, Tokyo (JP)

(73) Assignee: Sony Corporation (JP)

( * ) Notice: Subject to any disclaimer, the term of this patent is extended or adjusted under 35 U.S.C. 154(b) by 216 days.

(21) Appl. No.: 12/806,966

(22) Filed: Aug. 25, 2010

(65) Prior Publication Data

US 2011/0057875 A1    Mar. 10, 2011

(30) Foreign Application Priority Data

Sep. 4, 2009  (JP) ................ P2009-204958

(51) Int. Cl.
G09G 5/00 (2006.01)
G06F 3/01 (2006.01)
G06F 3/03 (2006.01)

(52) U.S. Cl.
CPC ............. G06F 3/011 (2013.01); G06F 3/0304 (2013.01)

(58) Field of Classification Search
USPC ........................................................ 345/156
See application file for complete search history.

(56) References Cited

U.S. PATENT DOCUMENTS

2001/0012001 A1* 8/2001 Rekimoto et al. ............ 345/173
2007/0297652 A1* 12/2007 Nishiyama et al. .......... 382/118
2008/0018595 A1* 1/2008 Hildreth et al. .............. 345/156
2009/0010570 A1* 1/2009 Yamada et al. .............. 382/312
2009/0201249 A1  8/2009 Yamamoto

FOREIGN PATENT DOCUMENTS

| JP | 2000267800 A | 9/2000 |
| JP | 2004258714 A | 9/2004 |
| JP | 2007072564 A | 3/2007 |
| JP | 2009-157919 A | 7/2009 |
| WO | 2009018161 A1 | 2/2009 |
| WO | 2009108894 A1 | 9/2009 |

OTHER PUBLICATIONS

Office Action from Japanese Application No. 2009-204958, dated Jun. 11, 2013.
Office Action from Japanese Application No. 2009-204958, dated Feb. 25, 2014.

* cited by examiner

*Primary Examiner* — Lixi C Simpson
*Assistant Examiner* — Ngan T Pham Lu
(74) *Attorney, Agent, or Firm* — Lerner, David, Littenberg, Krumholz & Mentlik, LLP

(57) ABSTRACT

A display control apparatus includes a recognizing unit configured to recognize a position of an operator and a position of a hand or the like of the operator, a calculating unit configured to regard a position of the operator in a screen coordinate system set on a screen as an origin of an operator coordinate system and multiply a position of the hand or the like with respect to the origin of the operator coordinate system by a predetermined function, thereby calculating a position of display information corresponding to the hand or the like in the screen coordinate system, and a control unit configured to cause the display information to be displayed at the position in the screen coordinate system calculated by the calculating unit.

11 Claims, 11 Drawing Sheets

DISPLAY CONTROL APPARATUS, DISPLAY CONTROL METHOD, AND DISPLAY CONTROL PROGRAM

CROSS-REFERENCE TO RELATED APPLICATION

The present application claims priority from Japanese Patent Application No. JP 2009-204958 filed in the Japanese Patent Office on Sep. 4, 2009, the entire content of which is incorporated herein by reference.

BACKGROUND OF THE INVENTION

1. Field of the Invention

The present invention relates to a display control apparatus, a display control method, and a display control program, and particularly relates to a display control apparatus installed with a graphical user interface (GUI) that can be simultaneously operated by a plurality of operators.

2. Description of the Related Art

Currently, many computers serving as display control apparatuses are installed with a GUI. In such computers, a pointer that moves on a screen in accordance with an operation performed by an operator is displayed. By indicating an arbitrary position on the screen with the pointer, the operator can select an icon or the like displayed on the screen.

A mouse or touch pad is typically used as an operation device for moving a pointer. Also, a controller for detecting a motion in space using a motion sensor and inputting the detected motion to a computer to move a pointer has been suggested (e.g., see Japanese Unexamined Patent Application Publication No. 2009-157919).

Also, the following computer has been suggested. That is, the position of a hand of an operator is detected from a mirror-reversed camera image, a pointer is displayed at the position corresponding to the position of the hand on a screen, and the pointer is moved in accordance with a movement of the hand. In such a computer, it is desirable that the operator can move the pointer to an arbitrary position on the screen only by moving his/her hand around his/her body regardless of the position of the operator in the camera image.

Thus, for example, the center of the body of the operator may be regarded as the center of the screen (i.e., the origin of a screen coordinate system), and the pointer may be displayed at the position of the hand of the operator with respect to the origin. Accordingly, the operator can move the pointer to an arbitrary position on the screen only by moving his/her hand around his/her body regardless of the position of the operator in a camera image (i.e., the position in an image capturing range).

Meanwhile, some of computers available in recent years, such as game machines, are based on the assumption that a single screen is simultaneously operated by a plurality of operators. The spread of such computers is expected to increase in the future.

SUMMARY OF THE INVENTION

However, under the assumption that operations are performed by a plurality of operators, if the center of the bodies of all the operators is regarded as the center of a screen, all the pointers move around the origin of the screen coordinate system, so that it becomes difficult to recognize the relationship between the operators and the pointers. As a result, the operability decreases disadvantageously compared to a case where operations are performed by a single operator.

Accordingly, it is desirable to provide a display control apparatus, a display control method, and a display control program that are capable of obtaining a good operability regardless of the number of operators who simultaneously perform operations.

According to an embodiment of the present invention, there is provided a display control apparatus that includes a recognizing unit configured to recognize a position of an operator and a position of operation means of the operator, a calculating unit configured to regard a position of the operator in a screen coordinate system set on a screen as an origin of an operator coordinate system and multiply a position of the operation means with respect to the origin of the operator coordinate system by a predetermined function, thereby calculating a position of display information corresponding to the operation means in the screen coordinate system, and a control unit configured to cause the display information to be displayed at the position in the screen coordinate system calculated by the calculating unit.

In this way, the position of the operator in the screen coordinate system is regarded as the origin of the operator coordinate system, and the position of display information (e.g., pointer) corresponding to the operation means in the screen coordinate system is calculated on the basis of the position of the operation means (e.g., a hand of the operator) with respect to the origin. Accordingly, when there are a plurality of operators, display information that is operated by individual operation means can be displayed with the positions corresponding to the positions of the plurality of operators being the centers on the screen.

At this time, the position of the operation means is not regarded as the position of the display information, but the position obtained by multiplying the position of the operation means with respect to the origin of the operator coordinate system by a predetermined function is regarded as the position of the display information in the screen coordinate system. Accordingly, each of a plurality of operators can move a corresponding piece of display information to an arbitrary position of the screen only by moving the operation means with his/her position being at the center when the function is appropriately selected.

According to an embodiment of the present invention, when there are a plurality of operators, pieces of display information operated by respective operation means can be displayed on a screen with the positions corresponding to the positions of the plurality of operators being the center. Furthermore, in this case, each the plurality of operators can move a corresponding piece of display information to an arbitrary position of the screen only by moving the operation means with the position of himself/herself being the center. Accordingly, a display control apparatus, a display control method, and a display control program that are capable of obtaining a good operability regardless of the number of operators who simultaneously perform operations can be realized.

DESCRIPTION OF THE PREFERRED EMBODIMENTS

Hereinafter, embodiments of the present invention will be described. The description will be given in the following order.

1. Embodiment
2. Other embodiments
1. Embodiment
1-1. Overview of Embodiment

First, an overview of an embodiment will be described. Then, a specific example of the embodiment will be described.

Figure 1:
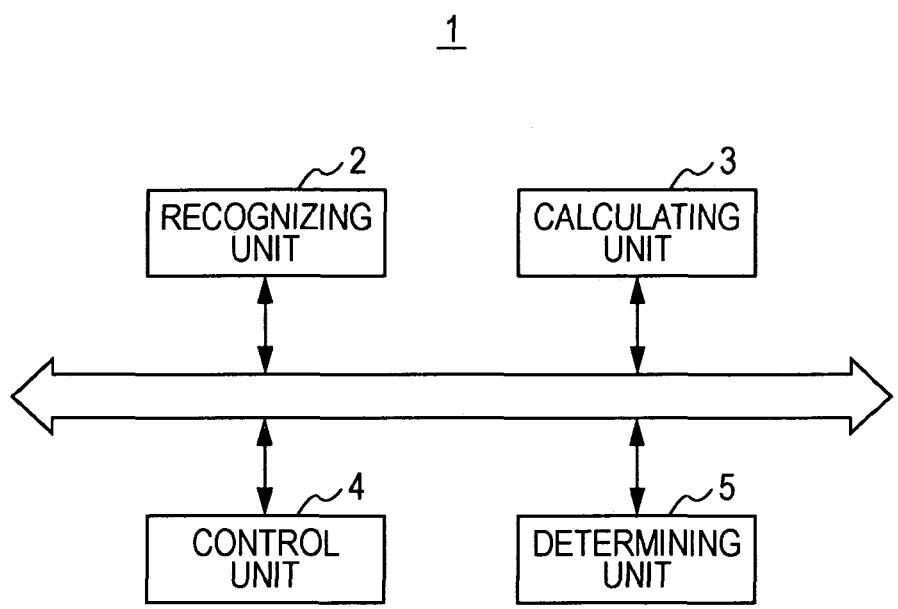
FIG. 1 is a schematic diagram illustrating a configuration of a display control apparatus, that is, an overview of an embodiment of the present invention.

FIG. 1 illustrates a display control apparatus 1. The display control apparatus 1 includes a recognizing unit 2 configured to recognize a position of an operator and a position of operation means of the operator. Also, the display control apparatus 1 includes a calculating unit 3 configured to regard a position of the operator in a screen coordinate system set on a screen as an origin of an operator coordinate system and multiply a position of the operation means with respect to the origin of the operator coordinate system by a predetermined function, thereby calculating a position of display information corresponding to the operation means in the screen coordinate system. Furthermore, the display control apparatus 1 includes a control unit 4 configured to cause the display information to be displayed at the position in the screen coordinate system calculated by the calculating unit 3.

In this way, the display control apparatus 1 regards the position of the operator in the screen coordinate system as the origin of the operator coordinate system, and calculates the position of display information (e.g., pointer) corresponding to the operation means in the screen coordinate system on the basis of the position of the operation means (e.g., a hand of the operator) with respect to the origin. Accordingly, when there are a plurality of operators, the display control apparatus 1 is capable of displaying display information that is operated by individual operation means with the positions corresponding to the positions of the plurality of operators being the centers on the screen.

At this time, the display control apparatus 1 does not regard the position of the operation means as the position of the display information, but regards the position obtained by multiplying the position of the operation means with respect to the origin of the operator coordinate system by a predetermined function as the position of the display information in the screen coordinate system. Accordingly, in the display control apparatus 1, each of a plurality of operators can move a corresponding piece of display information to an arbitrary position of the screen only by moving the operation means with his/her position being at the center when the function is appropriately selected.

More specifically, the recognizing unit 2 recognizes the position of the operator and the position of the operation means from a camera image. At this time, the calculating unit 3 regards a position of the operator in an image coordinate system of the camera image as the origin of the operator coordinate system, the image coordinate system being set as a coordinate system that is identical to the screen coordinate system, and multiplies the position of the operation means with respect to the origin of the operator coordinate system by the predetermined function, thereby calculating the position of the display information corresponding to the operation means in the screen coordinate system.

Also, the display control apparatus 1 may include a determining unit 5 configured to determine an operation range of the operation means. At this time, the calculating unit 3 multiplies the position of the operation means with respect to the origin of the operator coordinate system by a function based on the operation range determined by the determining unit 5 and a size of the screen.

When the position of the operation means is a position of a hand of the operator, the recognizing unit 2 recognizes a size of a body of the operator from the camera image. Furthermore, the determining unit 5 estimates a range within which the hand of the operator reaches from the position of the operator on the basis of the size of the body of the operator recognized by the recognizing unit and regards the range as the operation range of the operation means.

Also, the recognizing unit 2 may recognize a face of the operator from the camera image, and the determining unit 5 may estimate an age of the operator on the basis of the face of the operator recognized by the recognizing unit 2 and estimate the size of the body using a size of the face on the basis of the age.

Also, the recognizing unit 2 may recognize a gesture operation performed by the operation means from the camera image. When a gesture operation for specifying the operation range is recognized by the recognizing unit 2, the determining unit 5 may determine a range indicated by the gesture operation to be the operation range.

Furthermore, when the screen coordinate system is a three-dimensional coordinate system that has a depth direction in addition to horizontal and vertical directions, the recognizing unit 2 recognizes a distance from the position of the operator to the operation means in addition to the position of the operator, the size of the body of the operator, and the position of the operation means from the camera image.

At this time, the calculating unit 3 regards the position of the operator in the image coordinate system as the origin of the operator coordinate system, and multiplies the position of the operation means with respect to the origin of the operator coordinate system by a predetermined function, thereby calculating positions in the horizontal and vertical directions of the display information corresponding to the operation means in the screen coordinate system. Also, the calculating unit 3 multiplies the distance from the position of the operator to the operation means by a predetermined function, thereby calculating a position in the depth direction of the display information corresponding to the operation means in the screen coordinate system.

Furthermore, the determining unit 5 estimates ranges in the horizontal and vertical directions and a range in the depth direction within which the hand of the operator reaches from the position of the operator on the basis of the size of the body of the operator recognized by the recognizing unit 2, and determines the ranges to be the operation range of the operation means.

Also, the recognizing unit 2 may recognize an arm length of the operator from the camera image, and the determining unit 5 may determine the range in the depth direction of the operation range to be a range of the arm length/$\sqrt{2}$.

A specific example of the display control apparatus 1 having the above-described configuration will be described in detail below.

Figure 2:
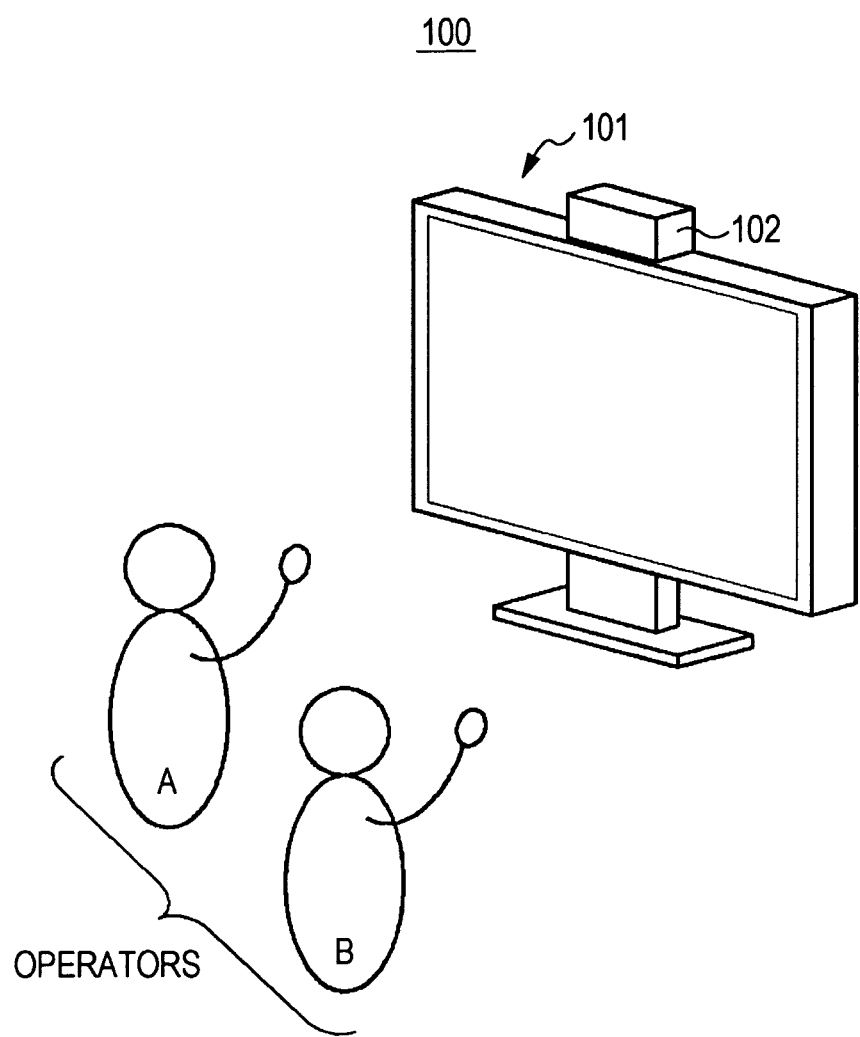
FIG. 2 is a schematic diagram illustrating a configuration of a multiperson simultaneous operation system, which is a specific example of the embodiment.

1-2. Specific Example of Embodiment 1-2-1. Configuration of Multiperson Simultaneous Operation System Next, a specific example of this embodiment will be described. FIG. 2 illustrates a multiperson simultaneous operation system 100 based on the assumption that a plurality of operators simultaneously perform operations therein.

The multiperson simultaneous operation system 100 includes a television receiver (hereinafter referred to as TV receiver) 101 and a stereo camera 102 connected to the TV receiver 101.

The stereo camera 102 is disposed at the top of the TV receiver 101 so as to face forward therefrom, and captures an image of an area in front of the TV receiver 101.

Here, assume that two operators A and B exist in an image capturing range of the stereo camera 102. In this case, the TV receiver 101 recognizes operations performed by the operators A and B on the basis of motions of hands of the operators A and B detected from a camera image captured by the stereo camera 102, and operates in accordance with the operations.

In this way, in the multiperson simultaneous operation system 100, both of the operators A and B can simultaneously operate the TV receiver 101 by moving their hands while facing the TV receiver 101.

1-2-2. Hardware Configurations of TV Receiver and Stereo Camera

Figure 3:
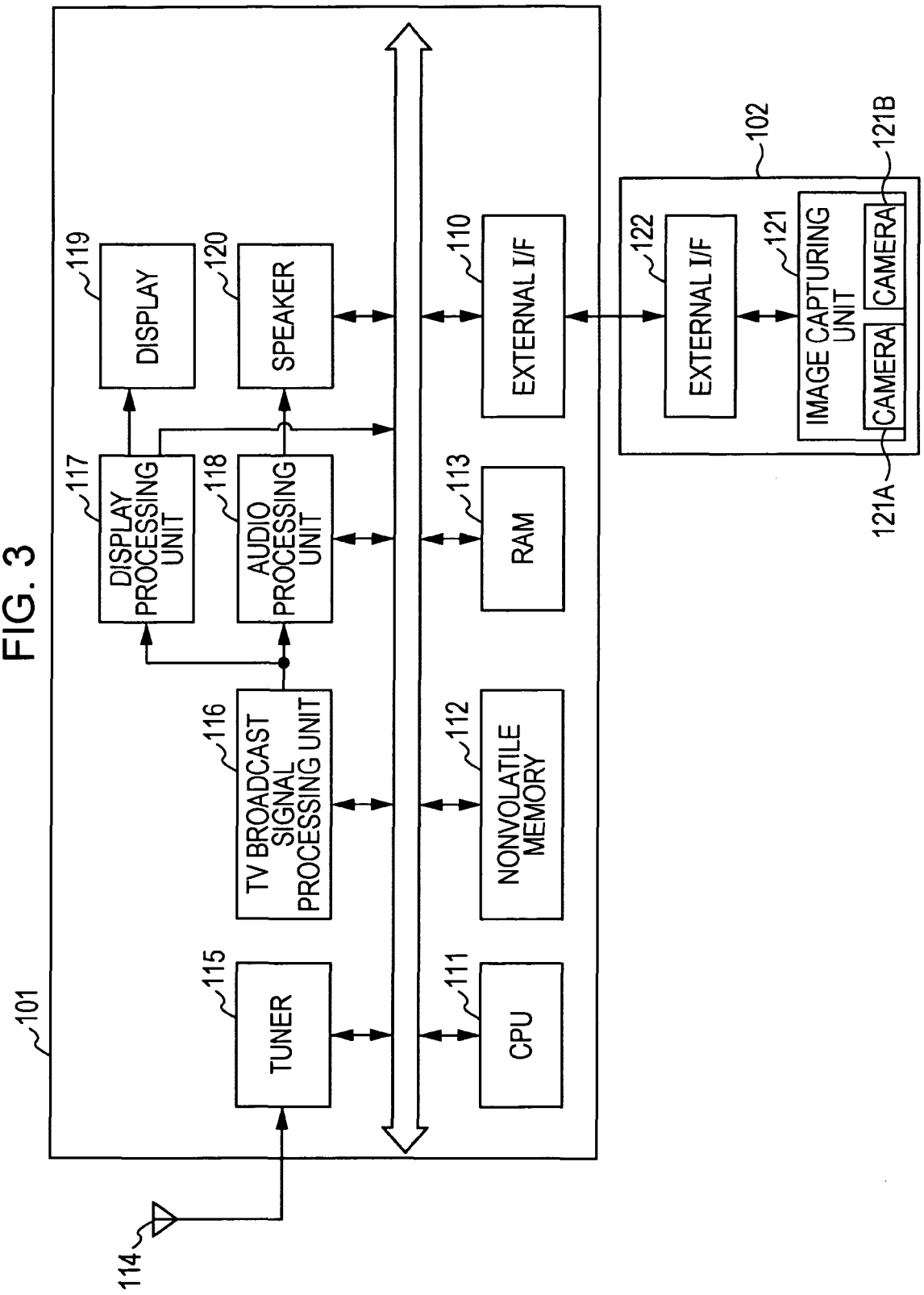
FIG. 3 is a block diagram illustrating a hardware configuration of a TV receiver and a stereo camera.

Next, hardware configurations of the TV receiver 101 and the stereo camera 102 will be described with reference to FIG. 3.

The TV receiver 101 is connected through a cable to the stereo camera 102 via an external interface (I/F) 110.

In the TV receiver 101, a central processing unit (CPU) 111 performs overall control on individual units. The CPU 111 expands a program written on a nonvolatile memory 112 in a random access memory (RAM) 113 and reads the program, and then performs various processes and controls the individual units in accordance with the program.

As described above, the TV receiver 101 detects motions of hands of operators and recognizes the motions as operations performed by the operators. Specifically, the CPU 111 of the TV receiver 101 controls the stereo camera 102 to capture an image of an area in front of the stereo camera 102 (i.e., an area in front of the TV receiver 101), and detects motions of hands of the operators A and B from a camera image obtained thereby. Then, the CPU 111 recognizes operations (pointer operation, gesture operation, etc.) performed by the operators A and B on the basis of the detected motions of the hands, and performs a process in accordance with the operations.

Actually, the TV receiver 101 is configured to display a GUI screen (the details will be described below) that is based on the assumption that such operations are simultaneously performed thereon by a plurality of operators. That is, a display processing unit 117 of the TV receiver 101 generates screen data of the GUI screen, performs predetermined display processing on the screen data to obtain screen signals, and transmits the screen signals to a display 119 under the control performed by the CPU 111. As a result, the GUI screen is displayed on the display 119.

Then, the CPU 111 causes a plurality of pointers that move in accordance with motions of hands of a plurality of operators to be displayed on the GUI screen. The TV receiver 101 is capable of being simultaneously operated by a plurality of operators via such a GUI screen.

Also, the TV receiver 101 has a function of outputting television broadcast (hereinafter referred to as TV broadcast). Actually, when outputting TV broadcast, the TV receiver 101 inputs TV broadcast signals received by an external antenna 114 into a tuner 115. The tuner 115 obtains TV broadcast signals of an arbitrary channel and transmits the signals to a TV broadcast signal processing unit 116 under the control performed by the CPU 111.

The TV broadcast signal processing unit 116 performs predetermined signal processing on the TV broadcast signals under the control performed by the CPU 111, thereby obtaining video data and audio data of a program from the TV broadcast signals. The video data is transmitted from the TV broadcast signal processing unit 116 to the display processing unit 117, whereas the audio data is transmitted from the TV broadcast signal processing unit 116 to an audio processing unit 118.

The display processing unit 117 performs predetermined display processing on the video data to obtain video signals, and transmits the video signals to the display 119 under the control performed by the CPU 111. As a result, videos of the program that is being broadcasted are displayed on the display 119.

On the other hand, the audio processing unit 118 performs predetermined audio processing on the audio data to obtain audio signals, and transmits the audio signals to a speaker 120 under the control performed by the CPU 111. As a result, audio of the program that is being broadcasted is output from the speaker 120.

In this way, the TV receiver 101 outputs TV broadcast and causes a user to watch and listen to the program of the TV broadcast.

On the other hand, the stereo camera 102 includes an image capturing unit 121 and an external interface (I/F) 122, and is connected to the TV receiver 101 via the external interface 122.

The image capturing unit 121 includes two cameras 121A and 121B that are arranged side by side, and is capable of capturing images of a front space in a three-dimensional (3D) manner using the two cameras 121A and 121B.

Actually, the image capturing unit 121 captures images of the front space at predetermined time intervals using the cameras 121A and 121B and sequentially transmits pieces of camera image data obtained thereby to the TV receiver 101 via the external interface 122 under the control performed by the TV receiver 101.

The camera image data transmitted to the TV receiver 101 includes camera image data that is captured by the camera 121A and camera image data that is captured by the camera 121B.

The TV receiver 101 recognizes each of operators A and B in front of the TV receiver 101 on the basis of the camera image data transmitted from the stereo camera 102.

Specifically, the CPU 111 of the TV receiver 101 performs a person detection process on camera image data captured by the camera 121A included in the camera image data transmitted from the stereo camera 102. In the person detection process, the CPU 111 detects the faces and hands of the operators A and B, for example.

Various algorithms are available for detecting a face. For example, a flesh-color area and feature quantities in the flesh-color area (portions that are estimated to be eyes and a mouth) are extracted from a camera image, and it is determined whether the flesh-color area is a face on the basis of a positional relationship between the feature quantities.

The CPU 111 detects areas of faces (also referred to as face areas) from a camera image by using such an algorithm and obtains the coordinates of the respective detected face areas (e.g., the coordinates of the centers of the respective face areas).

The coordinates are represented as coordinates in an X-Y plane, in which a horizontal axis serves as an X axis and a vertical axis serves as a Y axis, with the center of the camera image being the origin. That is, the coordinates can be regarded as coordinates in the X-Y plane, in which a horizontal axis viewed from the stereo camera 102 servers as an X axis and a vertical axis viewed from the stereo camera 102 serves as a Y axis, with the center of the image capturing range of the stereo camera 102 being the origin. The X-Y plane is parallel to a display surface of the display 119.

Also, various algorithms are available for detecting a hand. For example, a flesh-color area and a feature quantity in the flesh-color area (e.g., contour) are extracted from a camera image, and matching between the feature quantity and template images of a hand contour is performed, whereby it is determined whether the flesh-color area is a hand. At this time, a plurality of template images of different hand shapes may be prepared, and matching with the individual template images may be performed, so that the shape of a hand can be determined. For example, the shape of a hand closed into a rock shape in rock-paper-scissors (also referred to as rock shape) and the shape of a hand opened into a paper shape (also referred to as paper shape) can be determined.

The CPU 111 detects areas of hands (also referred to as hand areas) from the camera image by using such an algorithm and obtains the coordinates of the respective detected hand areas (e.g., the coordinates of the centers of the respective hand areas).

Now, assume that a camera image includes operators A and B. In this case, the coordinates in the X-Y plane of two faces and four hands are obtained through the person detection process. Accordingly, the CPU 111 can recognize the positional relationship in the horizontal and vertical directions of the two faces and four hands viewed from the stereo camera 102.

Furthermore, the CPU 111 calculates the distances from the stereo camera 102 to the two faces and four hands by using a stereo method on the basis of camera image data captured by the camera 121A and camera image data captured by the camera 121B. The unit of the calculated distances is cm, for example.

When an axis in the depth direction viewed from the stereo camera 102 is regarded as a Z axis, with the position of the stereo camera 102 being the origin, the distances can be represented by points on the Z axis.

In this way, by obtaining the coordinates in the X-Y plane and the points on the Z axis of the two faces and four hands, the coordinates in an X-Y-Z space of the two faces and four hands can be obtained.

Accordingly, the CPU 111 can recognize the positional relationship in the horizontal, vertical, and depth directions of the two faces and four hands viewed from the stereo camera 102, that is, the positional relationship in a 3D space.

Then, the CPU 111 determines the correspondence between the faces and hands on the basis of the positional relationship in the 3D space. That is, the CPU 111 determines the face and hands of each person (each operator). Specifically, the CPU 111 determines the two hands nearer to a face in the 3D space to be the hands of one person.

As a result, the face and hands are associated with each other for each of the operators A and B. After that, the CPU 111 detects the faces and hands of the operators A and B from camera image data transmitted from the stereo camera 102 at predetermined time intervals, thereby detecting motions (changes in position and shape) of the hands of the respective operators A and B while holding the correspondence between the faces and hands.

Then, on the basis of the motions of the hands of the operators A and B detected in this manner, the CPU 111 recognizes individual operations (pointer operation, gesture operation, etc.) performed by the operators A and B and performs a process in accordance with the operations.

1-2-3. GUI Screen

Next, a GUI screen displayed on the display 119 of the TV receiver 101 and operations performed on the GUI screen will be described in detail. For easy understanding, an example where one operator performs operations will be described first, and then an example where a plurality of operators perform operations will be described.

Figure 4:
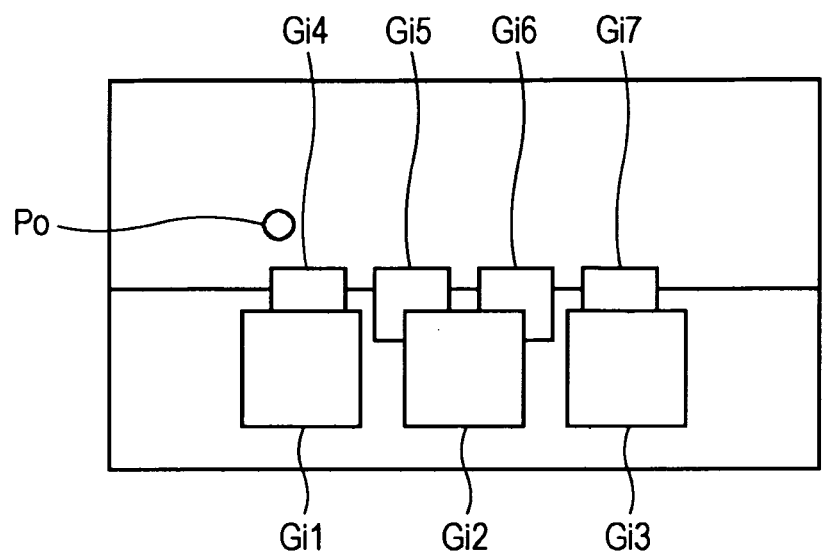
FIG. 4 is a schematic diagram illustrating a configuration of a GUI screen.

The CPU 111 of the TV receiver 101 causes the display 119 to display a GUI screen 130, as illustrated in FIG. 4.

The GUI screen 130 is displayed as a 3D screen that virtually has a depth direction in addition to horizontal and vertical directions. A plurality of icons Gi, which are arranged in a virtual 3D space (Xd-Yd-Zd space described below), are displayed on the GUI screen 130. In an example of the GUI screen 130 illustrated in FIG. 4, three icons Gi1 to Gi3 are arranged in the horizontal direction on the near side with predetermined intervals therebetween, and four icons Gi4 to Gi1 are arranged in the horizontal direction on the far side with predetermined intervals therebetween.

Furthermore, a pointer Po that moves in accordance with a motion of a hand of an operator captured by the stereo camera 102 is displayed on the GUI screen 130. That is, the operator can move the pointer Po to a desired position on the GUI screen 130 by moving his/her hand.

Figure 5:
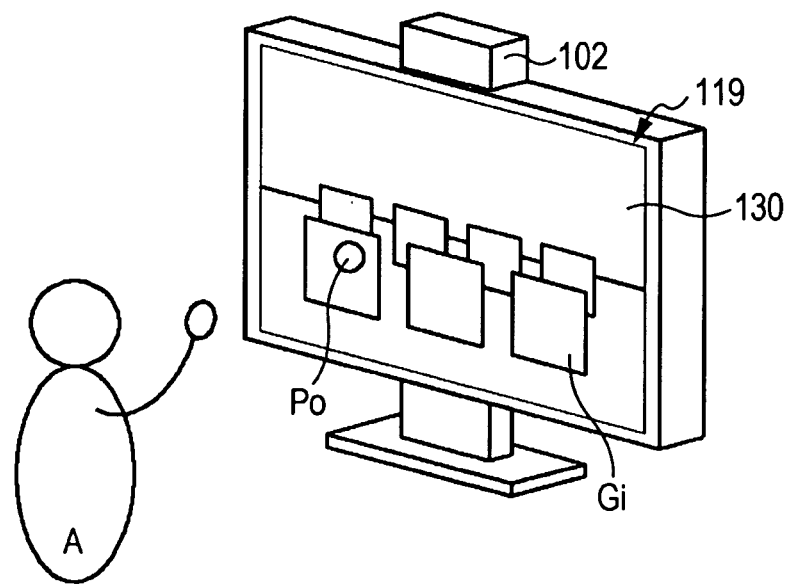
FIG. 5 is a schematic diagram for explaining a pointer operation on the GUI screen when a pointer is on the near side of the screen.
Figure 6:
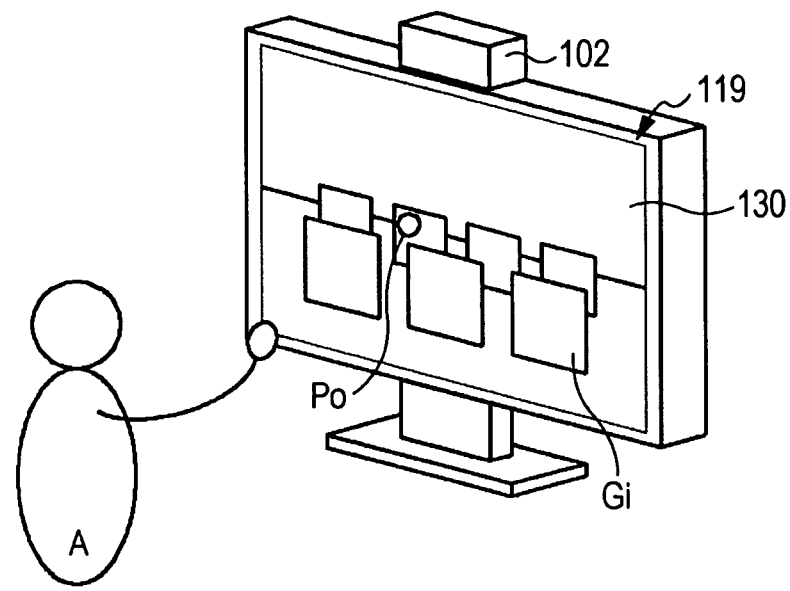
FIG. 6 is a schematic diagram for explaining a pointer operation on the GUI screen when a pointer is on the far side of the screen.

For example, as illustrated in FIGS. 5 and 6, an operator A can move the pointer Po in the depth direction by extending his/her hand forward, and can move the pointer Po in the right direction by moving his/her hand to the right.

Also, on the GUI screen 130, the operator A can specify an arbitrary icon Gi by moving the pointer Po onto the arbitrary icon Gi.

Furthermore, on the GUI screen 130, the operator A can move the pointer Po throughout the GUI screen 130, that is, in upward, downward, right, left, and depth directions only by moving his/her hand well within the range of motion of the hand without moving from the site where he/she exists.

Now, a detailed description will be given about a method for calculating the position of the pointer Po on the GUI screen 130 on the basis of the position of a hand of an operator captured by the stereo camera 102.

First, a description will be given about a coordinate system of the display 119 (i.e., a coordinate system of the GUI screen 130), a coordinate system of the stereo camera 102, and a coordinate system of a camera image captured by the stereo camera 102. Here, the coordinate system of the display 119 is also referred to as a screen coordinate system, the coordinate system of the stereo camera 102 is also referred to as a camera coordinate system, and the coordinate system of a camera image is also referred to as an image coordinate system.

Figure 7:
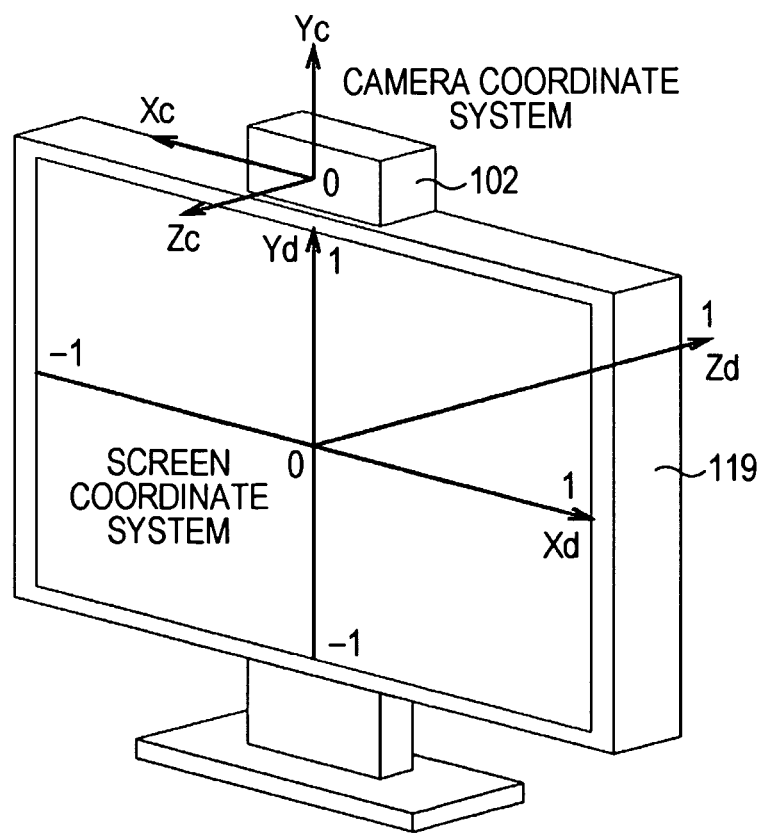
FIG. 7 is a schematic diagram illustrating a camera coordinate system and a screen coordinate system.

Specifically, as illustrated in FIG. 7, the screen coordinate system is set as a 3D coordinate system of the Xd-Yd-Zd space, in which the axis in the horizontal direction serves as an Xd axis, the axis in the vertical direction serves as a Yd axis, and the axis in the depth direction serves as a Zd axis, with the center of the display surface of the display 119 being the origin.

The Xd axis of the screen coordinate system is set such that the right side of the origin is a positive side and the left side of the origin is a negative side viewed from the front of the display 119. The Yd axis is set such that the upper side of the origin is a positive side and the lower side of the origin is a negative side. The Zd axis is set such that the far side of the origin is a positive side.

Furthermore, in this screen coordinate system, the Xd axis of the display 119 is normalized in the range from −1 to 1. Also, the Yd axis of the display 119 is normalized in the range from −1 to 1. Furthermore, the Zd axis of the display 119 is normalized in the range from 0 to 1.

On the GUI screen 130, the position of the pointer Po is represented as coordinates of the screen coordinate system. Here, the position of the pointer Po is represented as the coordinates px (Xd axis), py (Yd axis), and pz (Zd axis).

The camera coordinate system is set as a 3D coordinate system of an Xc-Yc-Zc space, in which the axis in the horizontal direction servers as an Xc axis, the axis in the vertical direction serves as a Yc axis, and the axis in the depth direction serves as a Zc axis, with the intermediate point between the cameras 121A and 121B arranged side by side being the origin.

Here, the stereo camera 102 is attached to the TV receiver 101 such that the origin of the camera coordinate system is positioned in a Yd-Zd plane of the screen coordinate system and that the Xc axis of the camera coordinate system is parallel with the Xd axis of the screen coordinate system. Thus, as long as this condition is satisfied, the stereo camera 102 may be attached to a lower portion of the display 119. In this way, the camera coordinate system serves as a coordinate system for determining the position of the stereo camera 102 with respect to the display 119.

The Xc axis of the camera coordinate system is set such that the left side of the origin is a positive side and that the right side of the origin is a negative side viewed from the front of the stereo camera 102, that is, the front of the display 119. The Yc axis is set such that the upper side of the origin is a positive side and that the lower side of the origin is a negative side. The Zc axis is set such that the near side of the origin is a positive side.

Figure 8:
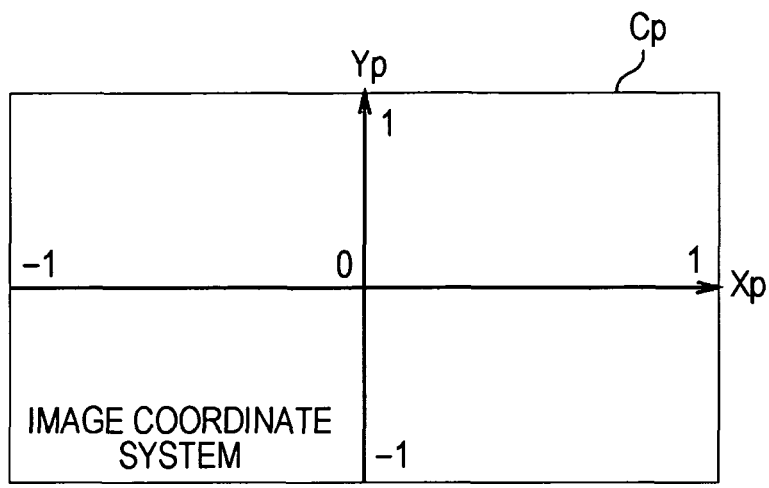
FIG. 8 is a schematic diagram illustrating an image coordinate system.

Furthermore, as illustrated in FIG. 8, the image coordinate system is set as a 2D coordinate system of an Xp-Yp plane, in which the axis in the horizontal direction serves as an Xp axis and the axis in the vertical direction serves as a Yp axis, with the center of a mirror-reversed camera image Cp being the origin.

The Xp axis of the image coordinate system is set such that the right side of the origin is a positive side and the left side of the origin is a negative side. The Yp axis is set such that the upper side of the origin is a positive side and that the lower side of the origin is a negative side.

Furthermore, in this image coordinate system, the Xp axis of a camera image is normalized in the range from −1 to 1. Also, in this image coordinate system, the Yp axis of the camera image is normalized in the range from −1 to 1.

That is, the coordinates of the image coordinate system are set to match the coordinates in the Xd-Yd plane of the above-described screen coordinate system. Accordingly, a position in a mirror-reversed camera image matches a position in the Xd-Yd plane of the GUI screen 130.

Here, a description will be given about a method for calculating coordinates (px, py) representing a position in the Xd-Yd plane (i.e., positions in the horizontal and vertical directions) among coordinates (px, py, pz) representing the position of the pointer Po on the GUI screen 130.

Figure 9:
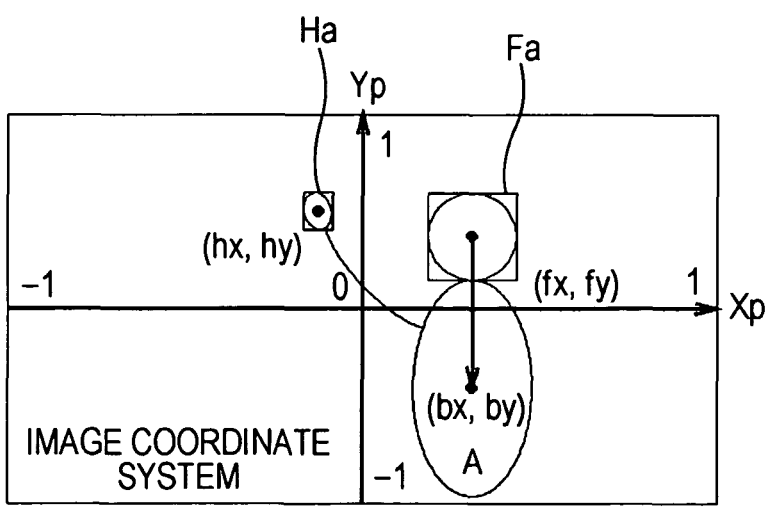
FIG. 9 is a schematic diagram illustrating center coordinates (bx, by) of a body of an operator.

As illustrates in FIG. 9, the CPU 111 obtains the center position and size of a face area Fa of the operator A from a mirror-reversed camera image Cp, and obtains the center position of the body of the operator A on the basis of the center position and size. Here, it is assumed that the horizontal direction of the body of the operator A is parallel with the Xc axis of the camera coordinate system. At this time, the CPU 111 obtains the center position of the face area Fa of the operator A as coordinates (fx, fy) of the image coordinate system. Also the CPU 111 obtains the center position of the body of the operator A as coordinates (bx, by) of the image coordinate system. It is assumed here that the operator A faces the stereo camera 102 of the camera coordinate system.

Actually, the center of a human body is positioned vertically below the center of the face. The size of the body of an operator can be determined using the size of the face of the operator on the basis of the relationship between average sizes of the face and body of a human. Therefore, if the center position of the face of the operator (fx, fy) and the size of the face of the operator can be obtained, the center position of the body (bx, by) can be obtained on the basis of the center position and size of the face.

Also, the CPU 111 obtains the center position of a hand area Ha of the operator A (i.e., the position of a hand of the operator A) from the mirror-reversed camera image Cp. At this time, the CPU 111 obtains the position of the hand of the operator A as coordinates (hx, hy) of the image coordinate system.

Figure 10:
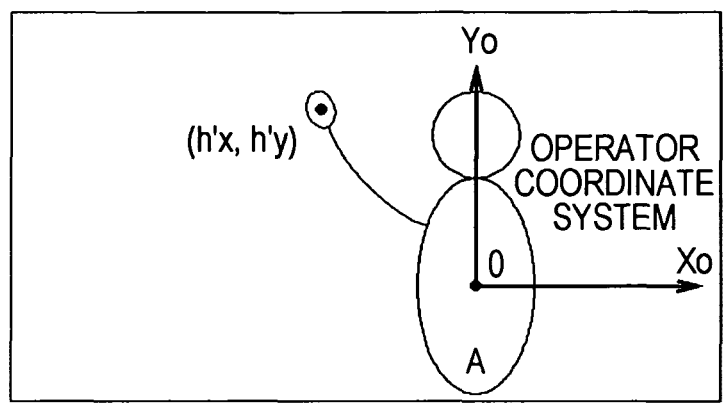
FIG. 10 is a schematic diagram illustrating an operator coordinate system and a position of a hand (h'x, h'y) viewed from the operator coordinate system.

Next, as illustrated in FIG. 10, the CPU 111 sets a coordinate system of the operator A (also referred to as operator coordinate system), in which the axis in the horizontal direction serves as an Xo axis and the axis in the vertical direction serves as a Yo axis, with the center position of the body of the operator A (bx, by) being the origin, in the image coordinate system.

Figure 11:
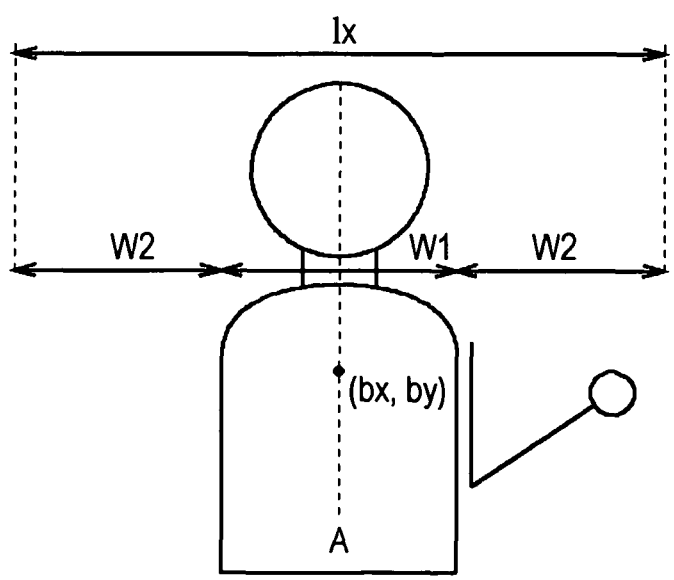
FIG. 11 is a schematic diagram for explaining determination of an operation range in the horizontal direction.

Furthermore, the CPU 111 transforms the position of the hand of the operator A (hx, hy) in the image coordinate system into the position viewed from the origin (bx, by) of the operator coordinate system. Here, as illustrated in FIG. 11, it is assumed that the position of the hand of the operator A viewed from the origin of the operator coordinate system is represented by coordinates (h'x, h'y). Then, the coordinate h'x is expressed by the following equation (1). The coordinate h'y is expressed by the following equation (2).

$$h'x = hx - bx \quad (1)$$

$$h'y = hy - by \quad (2)$$

Furthermore, the CPU 111 performs scaling on the position of the hand of the operator A (h'x, h'y) viewed from the origin of the operator coordinate system at a predetermined ratio, and then transforms the position into a position of the image coordinate system, that is, a position in the Xd-Yd plane of the screen coordinate system. The CPU 111 regards the position obtained thereby as the position of the pointer Po (px, py).

Here, it is assumed that the scaling ratio with respect to h'x is represented by sx and that the scaling ratio with respect to h'y is represented by sy. Then, the coordinate px representing the position of the pointer Po is expressed by the following equation (3). The coordinate py is expressed by the following equation (4). The scaling ratios will be described in detail below.

$$px = sxh'x + bx \quad (3)$$

$$py = syh'y + by \quad (4)$$

Each of px and py is a coordinate of the screen coordinate system, and is thus rounded to −1 when it is smaller than −1, and is rounded to 1 when it is larger than 1, on the basis of the following conditional expressions (5) and (6).

$$px = -1(px < -1), px = px(-1 \le px \le 1), px = 1(px > 1) \quad (5)$$

$$py = -1(py < -1), py = py(-1 < py < 1), py = 1(py > 1) \quad (6)$$

In this way, the CPU 111 calculates the position of the pointer Po (px, py) in the Xd-Yd plane of the GUI screen 130.

Now, the above-described scaling ratios sx and sy will be described. The scaling ratios sx and sy indicate how much the pointer Po is to be moved in an upward, downward, right, or left direction on the GUI screen 130 with respect to a motion in an upward, downward, right, or left direction of a hand of an operator. Actually, in the TV receiver 101, the scaling ratios are set so that an operator can move the pointer Po throughout the GUI screen 130 only by moving his/her hand well within the range of motion of the hand.

That is, the CPU 111 determines a range within which a hand of an operator easily reaches (also referred to as operation range). Specifically, as illustrated in FIG. 11, the CPU 111 obtains a shoulder width W1 and a length W2 from an elbow to fingertips of an operator A on the basis of the size of a face area of the operator A obtained from a mirror-reversed camera image.

The shoulder width W1 and the length W2 from an elbow to fingertips can be determined using the size of the face of the operator on the basis of the relationship between average sizes of face and body (shoulder width, arm length, the length from an elbow to fingertips, etc.) of a human.

Data based on such a relationship (arithmetic expression is also acceptable) is stored in the nonvolatile memory 112 of the TV receiver 101. The CPU 111 obtains the shoulder width W1 and the length W2 from an elbow to fingertips using the size of the face of the operator A on the basis of the data.

Then, the CPU 111 regards the range "shoulder width W1+length W2×2", with the center position bx in the horizontal direction of the body of the operator A being the center, as an operation range lx in the horizontal direction of the operator A.

That is, the CPU 111 regards, as the operation range lx in the horizontal direction, the range within which the hand of the operator A reaches while he/she moves only his/her forearm with his/her upper arm pointing downward.

The center position bx in the horizontal direction is obtained on the basis of the center position fx in the horizontal direction of the face of the operator A, as described above.

Figure 12:
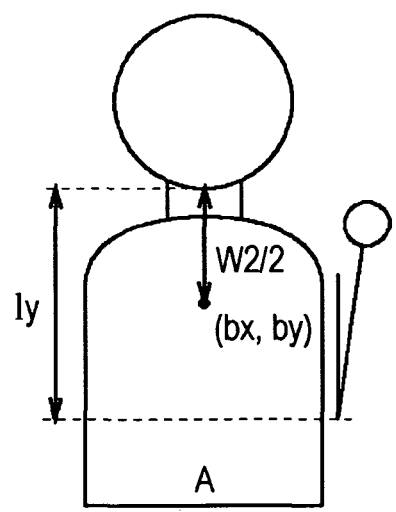
FIG. 12 is a schematic diagram for explaining determination of an operation range in the vertical direction.

Furthermore, as illustrated in FIG. 12, the CPU 111 regards the range from the lower end of the face of the operator A to the position of his/her elbow with the upper arm pointing downward as an operation range ly in the vertical direction of the operator A.

That is, the CPU 111 regards, as the operation range ly in the vertical direction, the range within which the hand of the operator A reaches while he/she moves only his/her forearm with his/her upper arm pointing downward.

The center position by in the vertical direction of the body of the operator A is just the midpoint of the operation range ly. That is, when the length from the position of the elbow with the upper arm pointing downward to the lower end of the face substantially matches the length W2 from the elbow to fingertips, the position at the half of the length W2 from the lower end of the face is regarded as the center position by in the vertical direction.

Then, the CPU 111 determines the range defined by the operation range lx in the horizontal direction and the operation range ly in the vertical direction to be the operation range of the operator A. This operation range is a range within which a hand moves when the operator A moves only his/her forearm with his/her upper arm pointing downward as described above, and is a range within which the hand of the operator A easily reaches.

Then, the CPU 111 sets scaling ratios so that the operator A can move the pointer Po throughout the GUI screen 130 in upward, downward, right, and left directions only by moving his/her hand in upward, downward, right, and left directions within this operation range.

Specifically, the CPU 111 calculates the length from the center position of the operator A to the further end from the center position of the operator A among the right and left ends of the screen coordinate system. This length is represented by |bx|+1. Here, assume that the further end from the center position of the operator A is the left end. At this time, the scaling ratio sx in the horizontal direction may be set so that the pointer Po moves to the left end of the screen coordinate system, that is, to the left end of the GUI screen 130, when the operator A moves his/her hand to the left end of the operation range lx.

Thus, the CPU 111 divides the length |bx|+1 from the center position of the operator A to the further end from the center position of the operator A by half of the operation range lx in the horizontal direction of the operator A, and sets the result as the scaling ratio sx in the horizontal direction. The scaling ratio sx is expressed by the following equation (7).

$$sx = (|bx|+1)/(lx/2) \quad (7)$$

Also, the CPU 111 calculates the length from the center position of the operator A to the further end from the center position of the operator A among the upper and lower ends of the screen coordinate system. This length is represented by |by|+1. Here, assume that the further end from the center position of the operator A is the upper end. At this time, the scaling ratio sy in the vertical direction may be set so that the pointer Po moves to the upper end of the screen coordinate system, that is, to the upper end of the GUI screen 130, when the operator A moves his/her hand to the upper end of the operation range ly.

Thus, the CPU 111 divides the length |by|+1 from the center position of the operator A to the further end from the center position of the operator A by half of the operation range ly in the vertical direction of the operator A, and sets the result as the scaling ratio sy in the vertical direction. The scaling ratio sy is expressed by the following equation (8).

$$sy = (|by|+1)/(ly/2) \quad (8)$$

In this way, the CPU 111 sets the scaling ratios sx and sy. As a result, on the GUI screen 130, the operator A can move the pointer Po throughout the GUI screen 130 in upward, downward, right, and left directions only by moving his/her hand in upward, downward, right, and left directions well within the range of motion of the hand at the position. Accordingly, the operator A can move the pointer Po to an arbitrary position on the GUI screen 130 without moving himself/herself or forcedly extending his/her arm regardless of the position of the operator A in the image capturing range. Therefore, the load of operation can be reduced.

Furthermore, since the CPU 111 sets the vertical operation range ly to the range from the position of the elbow with the upper arm pointing downward to the lower end of the face, the operator can operate the pointer Po without moving his/her hand in front of his/her face. Thus, the operator can easily see the GUI screen 130.

Next, a description will be given about a method for calculating the coordinate pz, which represents a position on the Zd axis (i.e., a position in the depth direction), among the coordinates px, py, and pz representing the position of the pointer Po on the GUI screen 130.

Figure 13:
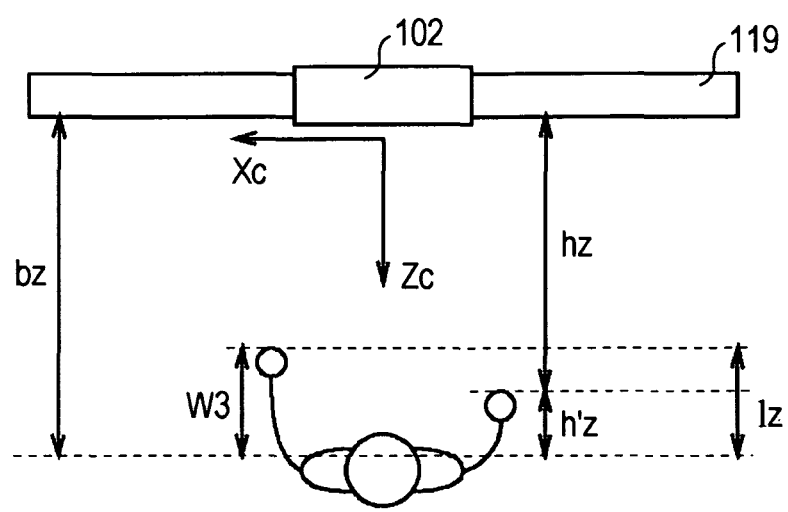
FIG. 13 is a schematic diagram for explaining determination of an operation range in the depth direction.

As illustrated in FIG. 13, the CPU 111 obtains a distance bz from the stereo camera 102 to the face of the operator A by using the stereo method. The distance bz can be regarded as the distance from the stereo camera 102 to the body of the operator A. Also, the CPU 111 obtains a distance hz from the stereo camera 102 to a hand of the operator A.

Furthermore, the CPU 111 obtains a distance h'z from the body of the operator A to the hand of the operator A on the basis of the distances bz and hz. The distance h'z is expressed by the following equation (9).

$$h'z = bz - hz \quad (9)$$

Furthermore, the CPU 111 performs scaling on the distance h'z from the body to hand of the operator A at a predetermined ratio and regards the scaling result as the position (pz) of the pointer Po on the Zd axis of the screen coordinate system.

Here, when the scaling ratio with respect to the distance h'z is represented by sz, the coordinate pz representing the position of the pointer Po is expressed by the following equation (10).

$$pz = sz h'z \quad (10)$$

The coordinate pz is a coordinate on the Zd axis of the screen coordinate system. Thus, the coordinate pz is rounded to "0" when it is smaller than "0" and is rounded to "1" when it is larger than 1 on the basis of the following conditional expression (11).

$$pz = 0(px < 0), pz = pz(0 \leq pz \leq 1), pz = 1(pz > 1) \quad (11)$$

In this way, the CPU 111 calculates the position (pz) of the pointer Po on the Zd axis of the GUI screen 130.

Now, the foregoing scaling ratio sz will be described. The scaling ratio sz represents how much the pointer Po is to be moved in the depth direction of the GUI screen 130 with respect to a motion in the depth direction of a hand of an operator.

In this case, too, the CPU 111 determines the range within which a hand of an operator easily reaches (operation range). Specifically, the CPU 111 obtains an arm length W3 of the operator A on the basis of the size of a face area of the operator A obtained from a mirror-reversed camera image.

Here, the arm length W3 can be determined using the size of the face of the operator A on the basis of the relationship between average sizes of human face and body (shoulder width, arm length, etc.).

The CPU 111 reads data based on such a relationship (arithmetic expression is also acceptable) from the nonvolatile memory 112 and obtains the arm length W3 by using the size of the face of the operator A on the basis of the data.

Then, the CPU 111 regards the range from the body to fingertips (i.e., the arm length W3) when the operator A extends his/her arm forward as the operation range lz in the depth direction of the operator A.

That is, the CPU 111 regards, as the operation range lz in the depth direction, the range within which the hand of the operator A reaches when he/she extends his/her arm forward.

Then, the CPU 111 sets a scaling ratio so that the operator A can move the pointer Po to the deepest position of the GUI 130 only by moving his/her hand in the depth direction within the operation range lz.

In this case, the scaling ratio sz in the depth direction may be set so that the pointer Po moves to the deepest position of the screen coordinate system, that is, to the deepest position of the GUI screen 130, when the operator A moves his/her hand to the deepest position of the operation range lz.

Thus, the CPU 111 divides the maximum value 1 on the Zd axis of the screen coordinate system by the operation range lz in the depth direction of the operator A, and regards the result as the scaling ratio sz in the depth direction. The scaling ratio sz is expressed by the following equation (12).

$$sz = 1/lz \quad (12)$$

In this way, the CPU 111 sets the scaling ratio sz. As a result, on the GUI screen 130, the operator A can move the pointer Po to the deepest position of the GUI screen 130 only by moving his/her hand in the depth direction well within the range of motion of the hand.

Accordingly, on the GUI screen 130, the operator A can move the pointer Po throughout the GUI screen 130 in upward, downward, right, left, and depth directions only by moving his/her hand in upward, downward, right, left, and depth directions well within the range of motion of the hand.

Furthermore, when there are a plurality of operators, the CPU 111 calculates the positions of pointers Po of the respective operators in the above-described manner.

For example, assume that there are two operators A and B in front of the TV receiver 101. In this case, a pointer PoA that moves around the position corresponding to the center position of the body of the operator A and a pointer PoB that moves around the position corresponding to the center position of the body of the operator B are displayed on the GUI screen 130.

Figure 14:
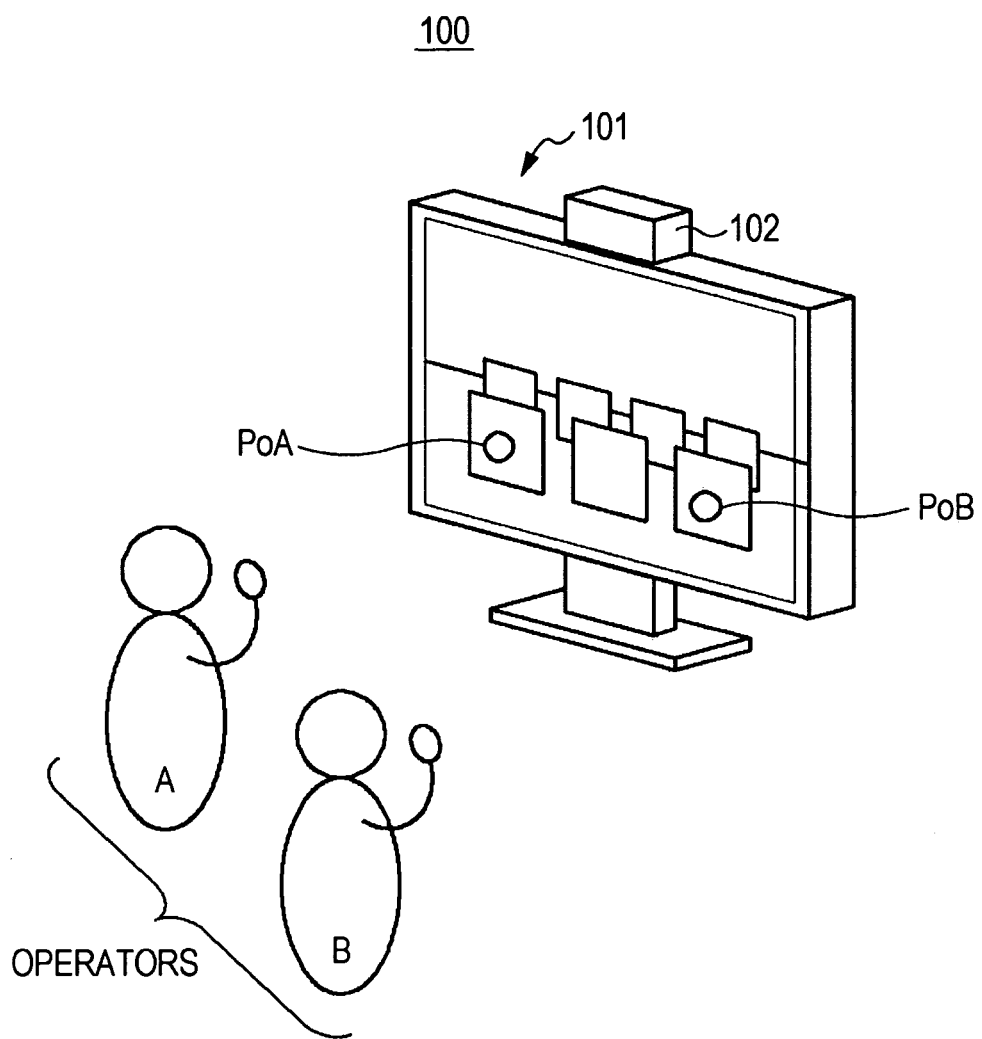
FIG. 14 is a schematic diagram illustrating positions of operators and positions of pointers.

At this time, assume that the hands of the respective operators A and B are close to the center positions of their bodies. Then, as illustrated in FIG. 14, the pointer PoA is displayed near the operator A and the pointer PoB is displayed near the operator B on the GUI screen 130.

As a result, each of the operators A and B can easily recognize the pointer Po that is operated by himself/herself among the pointers PoA and PoB displayed on the GUI screen 130.

In addition, a specific hardware example of the recognizing unit 2, calculating unit 3, control unit 4, and determining unit 5 of the display control apparatus 1 described above in the overview of the embodiment is the above-described CPU 111 of TV receiver 101. Also, the predetermined function described above in the overview includes the above-described scaling ratios sx, sy, and sz.

1-2-4. Pointer Display Process Procedure

Now, a description will be given about a procedure of a process related to displaying the pointer Po (also referred to as pointer display process procedure). The pointer display process procedure is a procedure of a pointer display process that is executed by the CPU 111 of the TV receiver 101 in accordance with a program written in the nonvolatile memory 112.

Figure 15:
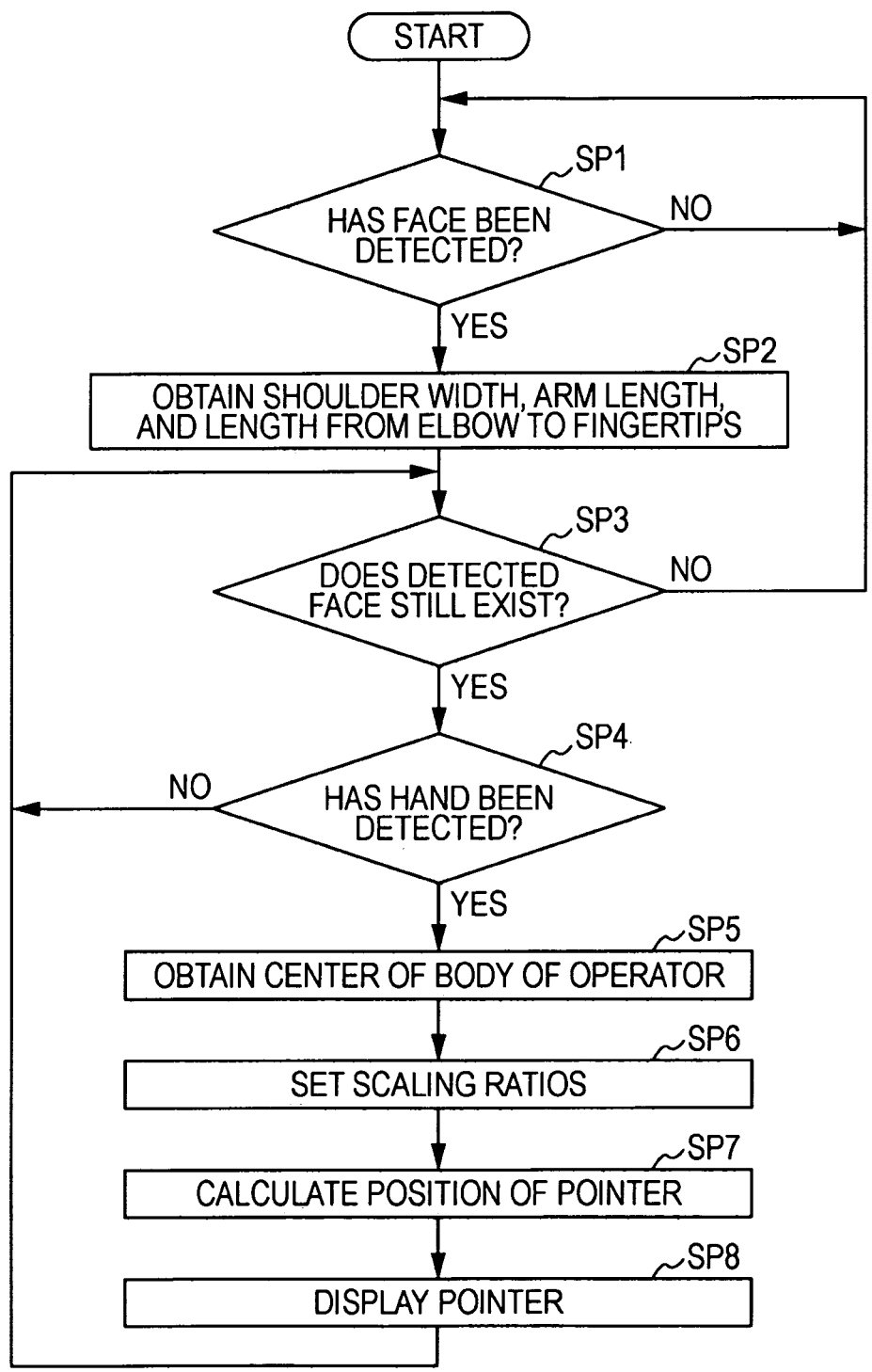
FIG. 15 is a flowchart illustrating a pointer display process procedure.

The CPU 111 causes the GUI screen 130 to be displayed, starts the pointer display process procedure RT1 illustrated in FIG. 15, and proceeds to step SP1.

In step SP1, the CPU 111 waits until a face of a person is detected from a camera image captured by the stereo camera 102.

If a face of a person is detected, the CPU 111 obtains a positive result in step SP1 and proceeds to step SP2.

In step SP2, the CPU 111 obtains a shoulder width, an arm length, and a length from an elbow to fingertips of the person on the basis of the face area of the detected face, and proceeds to step SP3. In step SP3, the CPU 111 determines whether the face detected in step SP1 is still included in the camera image or not.

If the previously-detected face is not included in the camera image, thereby obtaining a negative result, which means that the person just passed through the front of the TV receiver 101, i.e., that the person is not an operator. In this case, the CPU 111 returns to step SP1 and waits until a face of a person is detected again from a camera image.

In contrast, if the previously-detected face is still included in the camera image, thereby obtaining a positive result in step SP3, the CPU 111 proceeds to step SP4. In step SP4, the CPU 111 determines whether a hand of the operator whose face has been detected has been detected from the camera image or not.

If a negative result is obtained here, which means that a hand of the operator is outside the image capturing range of the stereo camera 102. Then, the CPU 111 returns to step SP3.

In contrast, if a hand of the operator has been detected from the camera image, thereby obtaining a positive result in step SP4, the CPU 111 proceeds to step SP5.

In step SP5, the CPU 111 obtains the operation range of the operator and the center position of the body (bx, by) of the operator on the basis of the center position and size of the face, shoulder width, arm length, and the length from an elbow to fingertips of the operator, and then proceeds to step SP6.

In step SP6, the CPU 111 sets scaling ratios sx and sy with respect to the position of a hand of the operator (h'x, h'y) in the operator coordinate system in which the center position of the body of the operator (bx, by) is the origin. Also, the CPU 111 sets a scaling ratio sz with respect to the distance h'z from the body to hand of the operator.

After setting the scaling ratios sx, sy, and sz in this manner, the CPU 111 proceeds to step SP7. In step SP7, the CPU 111 performs scaling on the position of the hand of the operator (h'x, h'y) and the distance h'z from the body to hand of the operator by using the set scaling ratios sx, sy, and sz, thereby calculating the position of the pointer Po (px, py, pz).

After calculating the position of the pointer Po in this manner, the CPU proceeds to step SP8. In step SP8, the CPU 111 causes the pointer Po to be displayed at the position calculated in step SP7 on the GUI screen 130, and returns to step SP3.

The CPU 111 controls display of the pointer Po in accordance with the above-described pointer display process procedure RT1.

1-2-5. Operation and Effect

In the above-described configuration, the CPU 111 of the TV receiver 101 detects the face and hand of an operator in front of the TV receiver 101 from a camera image captured by the stereo camera 102.

Subsequently, the CPU 111 obtains the size and center position (bx, by) of the body of the operator in the image coordinate system on the basis of the position and size of the face of the operator detected from the camera image.

The image coordinate system is set to the same coordinate system in the Xd-Yd plane of the screen coordinate system. Thus, a position in the camera image corresponds to a position in the Xd-Yd plane of the GUI screen 130.

Furthermore, the CPU 111 regards the center position of the body of the operator (bx, by) as the origin of the operator coordinate system and obtains the position of the hand of the operator (h'x, h'y) with respect to the origin. Furthermore, the CPU 111 performs scaling on the position (h'x, h'y) at the predetermined ratios (sx, sy) and then returns the position to a position in the Xd-Yd plane of the screen coordinate system.

Then, the CPU 111 regards the position obtained thereby as a display position of the pointer Po (px, py).

As described above, with the center position of the body of the operator in the Xd-Yd plane of the screen coordinate system being as it is, the CPU 111 regards the center position as the origin of the operator coordinate system and calculates the display position of the pointer Po on the basis of the position of the hand with respect to the origin.

In this way, when there are a plurality of operators, pointers Po that move around the positions corresponding to the center positions of the bodies of the respective operators can be displayed on the GUI screen 130. As a result, even when the plurality of pointers Po are displayed on the GUI screen 130, each of the plurality of operators can easily recognize the pointer Po that is to be operated by himself/herself.

Also, the CPU 111 determines the range in the horizontal and vertical directions within which the hand of the operator easily reaches (operation range). Then, on the basis of this range and the size in the horizontal and vertical directions of the GUI screen 130, the CPU 111 sets scaling ratios so that the pointer Po moves to an end of the GUI screen 130 when the operator moves his/her hand to an end of this range.

In this way, the operator can move the pointer Po throughout the GUI screen 130 only by moving his/her hand well within the range of motion of the hand.

Furthermore, the CPU 111 obtains the distance h'z from the body to hand of the operator on the basis of the distance from the stereo camera 102 to the face of the operator and the distance from the stereo camera 102 to the hand of the operator, which are detected from a camera image.

Furthermore, the CPU 111 performs scaling on the distance h'z at the predetermined ratio sz and regards the scaling result as the position on the Zd axis of the screen coordinate system.

Here, the CPU 111 determines the range in the depth direction within which the hand of the operator easily reaches (operation range). Then, on the basis of this range and the size in the depth direction of the GUI screen 130, the CPU 111 sets a scaling ratio so that the pointer Po moves to the deepest position of the GUI screen 130 when the operator extends his/her hand to the deepest position of this range.

In this way, the operator can move the pointer Po throughout the GUI screen 130 only by moving his/her hand well within the range of motion of the hand.

According to the above-described configuration, when there are a plurality of operators, the TV receiver 101 is capable of displaying, on the GUI screen 130, pointers Po that move around the positions corresponding to the center positions of the bodies of the respective operators. As a result, even when the plurality of pointers Po are displayed on the GUI screen 130, each of the plurality of operators can easily recognize the pointer that is to be operated by himself/herself.

Also, the TV receiver 101 enables an operator to move a pointer Po throughout the GUI screen 130 only by moving his/her hand well within the range of motion of the hand. Accordingly, in the TV receiver 101, a favorable operability can be obtained regardless of the number of operators who simultaneously perform operations.

2. Other Embodiments 2-1. Another Embodiment 1

In the above-described specific example of the embodiment, the position of the pointer Po (px, py, pz) is calculated under the assumption that the horizontal direction of the body of an operator is parallel with the Xc axis of the camera coordinate system (i.e., the anteroposterior direction of the body is parallel with the Zc axis of the camera coordinate system).

Figure 16:
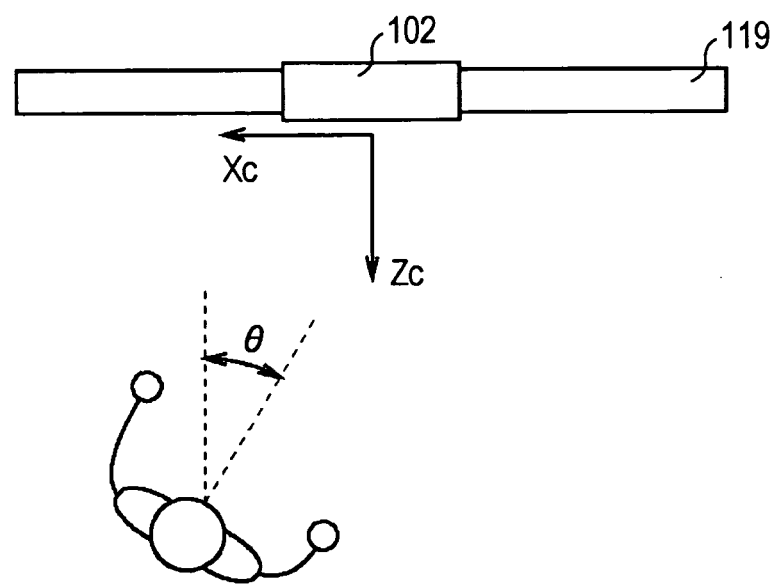
FIG. 16 is a schematic diagram for explaining a case where the body of an operator is tilted.

Now, a description will be given about a method for calculating the position of the pointer Po (px, py, pz) in a case where the anteroposterior direction of the body of the operator is tilted by an angle θ with respect to the Zc axis of the camera coordinate system, as illustrated in FIG. 16.

The CPU 111 detects the orientation of a face by determining the positions of the eyes and mouth in a face area of an operator detected from a camera image. Then, the CPU 111 regards the orientation of the face as a tilt of the body and obtains the tilt as a tilt angle θ with respect to the Zc axis.

Then, the CPU 111 estimates the position of a hand in the image coordinate system when the horizontal direction of the body becomes parallel to the Xc axis of the camera coordinate system after the body of the operator rotates by −θ.

Here, the position of the hand in the image coordinate system is represented by the coordinates (h″x, h″y), and the distance from the stereo camera 102 to the hand of the operator is represented by h″z. Then, when it is assumed that the stereo camera 102 is a pinhole camera, the coordinate h″x is expressed by the following equation (13). Also, the coordinate h″y is expressed by the following equation (14). Furthermore, the coordinate h″z is expressed by the following equation (15).

$$h''x = (1/\alpha h''z) \times (\cos\theta(\alpha hzhx - \alpha bzbx) + \sin\theta(hz-bz) + \alpha bzbx) \quad (13)$$

$$h''y = by \quad (14)$$

$$h''z = \sin\theta(\alpha hzhx - \alpha bzbx) - \cos\theta(bz-hz) + bz \quad (15)$$

Here, when a focal length is represented by f (the unit is m, for example) and when the width of the image sensor of the stereo camera 102 is represented by w (the unit is m, for example), α is expressed by the following equation (16).

$$\alpha = w/2_f \quad (16)$$

Then, the CPU 11 calculates h′x, h′y, and h′z on the basis of h″x, h″y, and h″z estimated in this manner. At this time, h′x is expressed by the following equation (17). Also, h′y is expressed by the following equation (18). Furthermore, h′z is expressed by the following equation (19).

$$h'x = h''x - bx \quad (17)$$

$$h'y = h''y - by \quad (18)$$

$$h'z = bz - h''z \quad (19)$$

Then, the CPU 111 substitutes h′x, h′y, and h′z obtained in this manner into equations (3), (4), and (10) according to the above-described embodiment, thereby calculating the position of the pointer Po (px, py, pz).

In this way, even when an operator is at a corner of the image capturing range of the stereo camera 102 and when the anteroposterior direction of the body of the operator is tilted with respect to the Zc axis of the camera coordinate system, the pointer Po can be displayed at a position by taking the tilt into consideration.

A method for determining a tilt of a body is not limited to the above-described method for making a determination on the basis of the orientation of a face, and another existing determination method may also be used.

2-2. Another Embodiment 2

In the above-described specific example of the embodiment, the scaling ratios sx, sy, and sz with respect to the position of a hand of an operator in the operator coordinate system are constant in the operation range. Alternatively, the scaling ratios sx, sy, and sz may be changed in the operation range.

Figure 17:
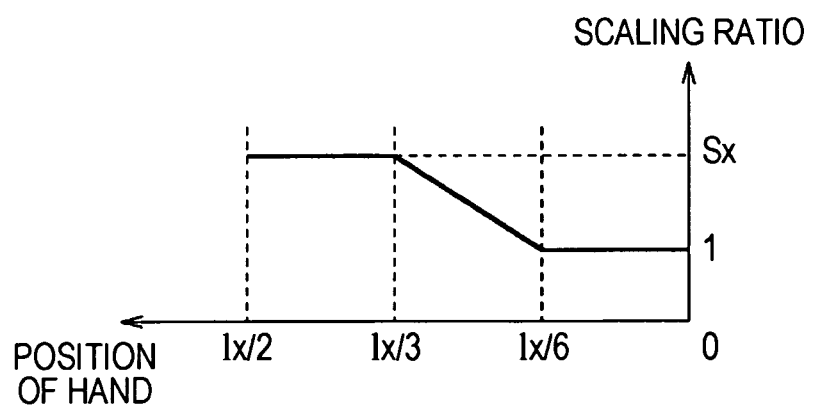
FIG. 17 is a graph illustrating changes in scaling ratio.

Here, assume that the scaling ratio sx in the horizontal direction is changed in accordance with the position h′x in the horizontal direction of the hand of the operator with respect to the origin of the operator coordinate system. In this case, when h′x is in the range from the origin to lx/6, the scaling ratio sx=1 as illustrated in FIG. 17, for example.

Furthermore, when h′x is in the range from lx/3 to lx/2 (that is, at an end of the operation range lx), sx=sx (i.e., (|bx|+1)/(lx/2)).

Furthermore, when h′x is in the range from lx/6 to lx/3, sx gradually increases from 1 to sx as h′x increases. In this case, a function is desirably prepared so that sx continuously changes.

That is, the scaling ratio sx is set to 1 when the hand of the operator is close to the center position of the body, and the scaling ratio sx is set to sx (i.e., (|bx|+1)/(lx/2)) when the hand of the operator is far from the center position of the body.

In this way, when the hand of the operator is close to the center position of the body, a movement quantity of the hand of the operator matches a movement quantity of the pointer Po, and the movement of the pointer Po becomes small. Accordingly, the operability can be increased when the operator operates the pointer Po near his/her body.

On the other hand, when the hand of the operator is far from the center position of the body, a movement quantity of the pointer Po is large with respect to a movement quantity of the hand of the operator. Accordingly, the pointer Po can be moved to a corner of the GUI screen 130.

A description has been given above about a change in the scaling ratio sx in the horizontal direction. Also, the scaling ratios sy and sz in the vertical direction and the depth direction may be changed in a similar manner.

2-3. Another embodiment 3

In the above-described specific example of the embodiment, the TV receiver 101 automatically determines an operation range by estimating the size of the body of an operator using the size of a face area of the operator detected from a camera image on the basis of the relationship between average sizes of human face and body.

Alternatively, the age of an operator may be estimated using a face image of the operator included in a camera image, and the size of the body of the operator may be estimated on the basis of the relationship between average sizes of human face and body for the age, whereby an operation range may be determined.

In this case, when the operator is a child, the size of body with respect to the size of face is small compared to an adult, and thus the operation range is small. In this way, an actual size of the body of the operator can be estimated more accurately, so that the operability can be further increased.

In addition, various algorithms are available as a method for determining the age (age group) of a person using a face image. For example, a plurality of feature quantities, such as the shape and color of a face, hair style, wrinkles, the positions of eyes and mouth, are detected from a face image. Furthermore, the plurality of feature quantities are classified into a predetermined number of groups, the feature quantities in the respective groups are compared with feature quantities that are prepared in units of age groups, whereby age groups are determined. Among the age groups determined in units of the groups of feature quantities, the major age group is determined to be the age group of the person in the face image.

Alternatively, an actual size of a body may be recognized by detecting the area of the body (also referred to as a body area) of an operator by analyzing a camera image, whereby an operation range may be determined.

In the above-described specific example of the embodiment, the range from the body to fingertips when the operator extends his/her arm forward (i.e., the arm length W3) is regarded as the operation range lz in the depth direction. Alternatively, a range of the arm length $W3/\sqrt{2}$ may be regarded as the operation range lz in the depth direction.

The reason why the arm length W3 is divided by 12 is that the range within which the hand of an operator reaches when the operator extends his/her arm to the four corners of the operation ranges lx and ly is regarded as the operation range lz in the depth direction.

Alternatively, the length W2 from an elbow to fingertips or a range of $W2/\sqrt{2}$ may be regarded as the operation range lz in the depth direction.

In the above-described specific example of the embodiment, the ranges within which a hand of an operator reaches with his/her arm pointing downward are regarded as the operation ranges lx and ly. Alternatively, the ranges within which a hand of an operator reaches with his/her arm extending in upward, downward, right, and left directions may be regarded as the operation ranges lx and lz.

As described above, the operation ranges lx, ly, and lz may be determined in various methods.

Alternatively, the operation ranges may be manually set by each operator instead of being automatically determined.

In that case, an operator is caused to perform a gesture operation to specify desired operation ranges lx, ly, and lz. Specifically, an operator performs a specific gesture operation at eight positions in total: the positions corresponding to the four corners of the operation ranges lx and ly on each of the near side and the far side. The specific operation is a gesture operation of closing an open hand and then opening the closed hand, like "paper", "rock", and "paper" in rock-paper-scissors.

The CPU 111 regards the space defined by the eight positions where the specific gesture operation is performed as the operation ranges lx, ly, and lz of the operator.

Then, the CPU 111 associates the operation ranges lx, ly, and lz with the face image of the operator and causes the nonvolatile memory 112 to store the operation ranges lx, ly, and lz as operation range data.

Accordingly, when the stereo camera 102 captures this operator thereafter, the CPU 111 reads the operation range data corresponding to the face image of this operator from the nonvolatile memory 112 and sets the operation ranges lx, ly, and lz.

In this way, individual operators can set a range within which he/she can easily move his/her hand as an operation range, so that the operability of operating a pointer Po can be further increased.

Also, for example, an operator may perform a gesture operation of describing a rectangle representing the operation ranges lx and ly on the near side and the far side, and the CPU 111 may regard the space defined by the rectangle on the near side and the rectangle on the far side as the operation ranges lx, ly, and lz of the operator.

That is, an operator may be caused to perform a gesture operation of specifying a space corresponding to an operation range, i.e., a gesture operation of specifying at least two points on diagonals of the space.

2-4. Another Embodiment 4

Furthermore, in the above-described specific example of the embodiment, the position of a hand of an operator is detected from a camera image captured by the stereo camera 102, and a display position of a pointer Po on the GUI screen 130 is calculated on the basis of the position of the hand.

Alternatively, the operator may be caused to hold a predetermined controller, the position of the controller may be detected on the basis of a signal (e.g., light signal) emitted from the controller, and a display position the pointer Po on the GUI screen 130 may be calculated on the basis of the position of the controller.

2-5. Another Embodiment 5

In the above-described specific example of the embodiment, the stereo camera 102 is externally connected to the TV receiver 101. Alternatively, the stereo camera 102 may be provided inside the TV receiver 101.

Instead of the stereo camera 102, an infrared camera or an ordinary monocular camera may be connected to the TV receiver 101 or may be provided therein. When a monocular camera is used, for example, information in the depth direction lacks and thus the accuracy of determining the correspondence between a face and a hand decreases, but the configuration is simpler than that in the case of using the stereo camera.

2-6. Another Embodiment 6

In the above-described specific example of the embodiment, the GUI screen 130, serving as a 3D screen virtually having a depth direction in addition to horizontal and vertical directions, is used. Alternatively, a 2D screen having horizontal and vertical directions may be used as long as a pointer can be operated on the screen.

When such a 2D screen is used, the stereo camera 102 is not necessarily used, and a normal monocular camera can be used. In this case, the concept of the depth direction is eliminated from the above-described embodiment.

2-7. Another Embodiment 7

In the above-described specific example of the embodiment, the CPU 111 that serves as a recognizing unit, a calculating unit, a control unit, and a determining unit is provided in the TV receiver 101 serving as a display control apparatus.

Alternatively, the individual function units of the TV receiver 101 (recognizing unit, calculating unit, control unit, and determining unit) may be configured using other various types of hardware or software as long as similar functions can be ensured.

In the above-described specific example of the embodiment, multiperson simultaneous operation system 100 including the TV receiver 101 and the stereo camera 102 is used. Alternatively, other various types of systems may be accepted as long as the systems can be simultaneously operated by a plurality of operators. For example, a system including a personal computer, a display, and a stereo camera may be accepted.

2-8. Another Embodiment 8

In the above-described specific example of the embodiment, a program for executing various processes is written on the nonvolatile memory 112 of the TV receiver 101.

Alternatively, the program may be written on a recording medium, such as an optical disc or a memory card, and the CPU 111 of the TV receiver 101 may read the program from the recording medium. In this case, a drive for the recording medium is connected to the external interface 110 of the TV receiver 101.

Also, a network interface may be provided in the TV receiver 101, and the program may be downloaded via the network interface and installed in the nonvolatile memory 112.

2-9. Another Embodiment 9

Furthermore, the embodiments of the present invention are not limited to the overview and specific example of the above-described embodiment and the other embodiments. That is, the application range of the embodiments of the present invention covers an arbitrary combination of part or all of the overview and specific example of the above-described embodiment and the other embodiments, or an extracted part thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
    a recognizing unit configured to recognize a position of an operator and a position of an operation object of the operator;
    a calculating unit configured to regard a position of the operator in a screen coordinate system set on a screen as an origin of an operator coordinate system and to calculate a position of display information corresponding to the operation object in the screen coordinate system; and
    a control unit configured to cause the display information to be displayed at the position in the screen coordinate system calculated by the calculating unit; and
    a determining unit configured to (i) determine a first operation range of the operation object in a first direction and a second operation range of the operation object in a second direction which is different from the first direction and (ii) set a first scaling ratio in the first direction based on the determined first operation range and a size of the screen in said first direction and set a second scaling ratio in the second direction based on the determined second operation range and a size of the screen in said second direction such that when the operation object is moved by the operator to an end of the operation range in the first direction the operation object is located at an end of the screen in the first direction and such that when the operation object is moved by the operator to an end of the operation range in the second direction the operation object is located at an end of the screen in the second direction.

2. The display control apparatus according to claim 1,
    wherein, the recognizing unit recognizes the position of the operator and the position of the operation object from a camera image, and the calculating unit regards a position of the operator in an image coordinate system of the camera image as the origin of the operator coordinate system, the image coordinate system being set as a coordinate system that is identical to the screen coordinate system.

3. The display control apparatus according to claim 1,
    wherein, the position of the operation object is a position of a hand of the operator.

4. The display control apparatus according to claim 1,
    wherein, the recognizing unit recognizes a gesture operation performed by the operation object from the camera image.

5. The display control apparatus according to claim 1,
    wherein, the recognizing unit determines the correspondence between the operator and the operation object based on a positional relationship between the operator and the operation object.

6. The display control apparatus according to claim 1, in which the first direction is one of a horizontal direction or a vertical direction relative to the screen and the second direction is the other one of the horizontal direction or the vertical direction.

7. The display control apparatus according to claim 6, in which the determining unit is further configured to (i) determine a third operation range of the operation object in a third direction which is a depth direction so as to be perpendicular to both the horizontal direction and the vertical direction and (ii) set a third scaling ratio in the third direction based on the determined third operation range and a size of the screen in said third direction such that when the operation object is moved by the operator to an end of the operation range in the third direction the operation object is located at an end of the screen in the third direction.

8. A display control method performed by an information processing apparatus, the display control method comprising the steps of:
    recognizing a position of an operator and a position of an operation object of the operator;
    regarding a position of the operator in a screen coordinate system set on a screen as an origin of an operator coordinate system and multiplying a position of the operation object with respect to the origin of the operator coordinate system by a predetermined function, to calculate a position of display information corresponding to the operation object in the screen coordinate system;
    causing the display information to be displayed at the calculated position in the screen coordinate system; and
    determining a first operation range of the operation object in a first direction and a second operation range of the operation object in a second direction which is different from the first direction, and setting a first scaling ratio in the first direction based on the determined first operation range and a size of the screen in said first direction and set a second scaling ratio in the second direction based on the determined second operation range and a size of the screen in said second direction, such that when the operation object is moved by the operator to an end of the operation range in the first direction the operation object is located at an end of the screen in the first direction and such that when the operation object is moved by the operator to an end of the operation range in the second direction the operation object is located at an end of the screen in the second direction.

9. The display control method according to claim 8,
    wherein, the recognizing step determines the correspondence between the operator and the operation object based on a positional relationship between the operator and the operation object.

10. A non-transitory computer readable recording medium having stored thereon a display control program that causes an information processing apparatus to execute:

recognizing a position of an operator and a position of an operation object of the operator;

regarding a position of the operator in a screen coordinate system set on a screen as an origin of an operator coordinate system and calculating a position of display information corresponding to the operation object in the screen coordinate system;

causing the display information to be displayed at the calculated position in the screen coordinate system; and determining a first operation range of the operation object in a first direction and a second operation range of the operation object in a second direction which is different from the first direction, and setting a first scaling ratio in the first direction based on the determined first operation range and a size of the screen in said first direction and set a second scaling ratio in the second direction based on the determined second operation range and a size of the screen in said second direction, such that when the operation object is moved by the operator to an end of the operation range in the first direction the operation object is located at an end of the screen in the first direction and such that when the operation object is moved by the operator to an end of the operation range in the second direction the operation object is located at an end of the screen in the second direction.

11. The non-transitory computer readable recording medium according to claim 10, wherein, the recognizing determines the correspondence between the operator and the operation object based on a positional relationship between the operator and the operation object.

\* \* \* \* \*